United States Patent [19]

Hoffberger, II et al.

[11] 3,849,598

[45] Nov. 19, 1974

[54] TELEVISION SCREEN LIGHT SHIELD

[76] Inventors: Charles C. Hoffberger, II, 2 Marina Plaza, Sarasota, Fla. 33577; Charles A. Rivlin, 2245 Rogene Dr., Baltimore, Md. 21209

[22] Filed: Nov. 20, 1973

[21] Appl. No.: 417,611

[52] U.S. Cl. .................... 178/7.82, 178/7.9, 353/75, 353/97

[51] Int. Cl. .......................... H01j 24/06, H04n 5/64

[58] Field of Search .............. 178/7.82, 7.9; 353/74, 353/75, 97

[56] References Cited

UNITED STATES PATENTS

| | | | |
|---|---|---|---|
| 3,733,436 | 5/1973 | Rose | 178/7.82 |
| 3,781,471 | 12/1973 | Hoffberger | 178/7.82 |

*Primary Examiner*—Howard W. Britton

[57] ABSTRACT

An extremely simple and inexpensive light shield or shroud for television screens, adjustable in nature, for encirlcing the screen of a television set (or the front end of the set itself), thus enabling viewing of the screen in sunlight or other areas where excessive light reduces the contrast in the screen such as to otherwise prevent adequate viewing. In collapsed form, the shield lies flat for shipment or storage purposes, yet it can be readily pivoted in place, with the two adjustable sides being pivotally positioned together with an adjustable top and bottom, and then conformed in dimension to the top, bottom and sides of the television set, thus to adequately shield the screen from sunlight (or artificial glare) by the resultant rectangular enclosure.

The entire assembly is comprised of four identically shaped sections of cardboard or equivalent material, each of which is scored near the mid-section thereof in order that each of these elements can be configured to a right-angular shape and pivotally interconnected, thus to form the desired rectangular shape. At the forward end (away from the television screen), each of these elements is provided with apertures on each side of the widest end thereof, and these are adapted to interfit with like apertures in an adjacent right-angular configuration. These apertures permit the insertion of a suitable pressure applied grommet or equivalent, thus permitting adjustment, and fixed adjustment of the adjacent elements to different sized television screens.

6 Claims, 3 Drawing Figures

TELEVISION SCREEN LIGHT SHIELD

BACKGROUND OF THE INVENTION AND PRIOR ART

The present invention relates broadly to a portable and adjustable device for the shielding of the screen of various types of image projecting devices or apparatus, such as television receivers, oscilloscopes, and so on. In more particular the improvement represented by this invention is most suitable for use with the portable type of television set, the latter being of light weight and quite readily transported from place to place. With regard to this type of instrument it is of course obvious that the same is marketed in various different sizes and that accordingly, any type of light shield or shroud for the screen which itself is of a fixed size would only be suitable for use for one definite and standard size television apparatus.

It is thus manifestly undesirable to manufacture any type of light shield which is not suitable for adjustment to different size television screens or sets. Similarly, it is equally undesirable to provide such a type of device which is permanently attached to the set, not easily removable, and completely unnecessary for use with such apparatus when the latter is utilized under proper lighting conditions so that the image transmitted to the screens thereof is readily observable. The problem more commonly arises when an ordinary portable television receiver, for example, is taken from indoors to the outside where it is subjected to direct exposure to sunlight. Here the glare from the sun is such that, unless the screen be shielded or protected in some manner, the image appearing thereon is exhibited with little or no contrast with the background, and is thus hardly observable at all. Hence light shields of this invention find particular use when the set is taken outdoors, such as to a picnic area or aboard a pleasure boat, etc. There is therefore an immediate need for the type of device represented by the invention herein disclosed and claimed.

Typical prior art schemes seeking the same solution are of the type adverted to above: fixed shields, meaning more or less permanently attached to the receiver casing, and most importantly, not adjustable in nature. For example, the devices represented in such patents as numbers 3,329,770, 3,329,771 and 3,564,138, although aiming toward a similar concept insofar as shielding be concerned, are not adaptable to the uses to which this present invention is addressed. Primarily, they involve the fixed type of arrangement above referred to, meaning they are permanently attached to the receiving apparatus in one way or another, or at least require considerable effort to attach to or detach from the set. More significantly, they are not adjustable as to height or width and, therefore, are useful only in connection with a predetermined size of television apparatus. In the first one of the above mentioned patents certain flaps mounted on the sides and top of the set are more or less permanently attached thereto and prefabricated, or must be prefabricated, only for use with a television apparatus of a particular size. Such elements are thus not adaptable for transfer to a set of different dimensions. The remaining two patents reside in the same category - shielding devices, more or less in the nature of folded, extendable flaps, which are of set predetermined size and thus limited to mounting with regard to only the certain dimensions of a given television apparatus.

Another disadvantage of such prior art devices, aside from their lack of adjustability, is that the same are not conductive to folding in a completely flattened position, this for the purpose of either shipment or retail sales, or for storage purposes, as when shielding of the screen is completely unnecessary, i.e., when the television is being used in shaded areas, as indoors, or under proper lighting conditions enabling adequate viewing. In any event, in this latter regard, the instant invention is susceptible to complete folding into a collapsed position. All elements of this shielding device are so pivoted in such interrelated fashion as to permit not only rapid extension and adjustment to the shielding position, but to permit equally facile return to an original position wherein all of the shielding elements are positioned in flattened position for storage or shipment.

In our copending application for patent, Ser. No. 319,005, filed Dec. 27, 1972, and now Patent No. of which this is a continuation-in-part, a somewhat similar device for similar purposes is explained. Although with regard to such previous invention, the there assembly does represent a manifestly simplified arrangement, the same does require the use of a forward and hinged wire or rod-like element to which each of the sides and top members are hingeably attached. The present invention is an improvement over the previous one in that it is even more simplified, dispensing with such additional element as the rod-like member. At the same time it achieves the same purposes at, of course, less cost of manufacture and consequently far less expense to the consumer, rendering replacement after some wear far easier and much more economical.

OBJECTS OF THE INVENTION

It is therefore a primary object of this invention to provide a shield or shroud means for an image exhibiting apparatus having a viewing screen which is adjustable in nature, meaning that it is variable within the option of the operator as to both height and width, so that same can be readily fitted to almost any size of such apparatus having some form of screen upon which this type of image is projected. Once in place, the assembly completely excludes light from impinging upon the screen, thus to permit adequate viewing in such as sunlit areas.

It is another object of the invention to provide a device of such type that when not in use, or when for example, shipped for sale, the same can be easily and quickly collapsed to a completely flattened position.

It is a further object of our invention to provide such an improved shielding device wherein once the proper adjustment to a given screen device be made by use of a plurality of overlapping top, bottom and side members, which in each instance are pivoted to each other, the same may be retained in the final adjusted position to remain there for as long a time as necessary.

It is another object of the invention to provide a device of the foregoing type which may be fabricated at extremely low cost, in the sense that the baseboard, top and side elements may be made of such light and inexpensive materials as cardboard, hard board, plastic, or light metals. The entire unit, of such simplified nature, permits economic replacement when worn, or when perhaps damaged through inadvertence.

It is an additional object of the invention to provide a device as above briefly described wherein each of the four pivoted sections are of the same width and length dimension, and in other respects also, substantially identical to each other, thus again contributing to ease of manufacture and low cost mass production.

DESCRIPTION OF DRAWINGS

The structure and mode of operation of our invention may be fully described and better understood by reference to the accompanying drawings, wherein.

DETAILED DESCRIPTION OF THE INVENTION

Figures 1, 3:
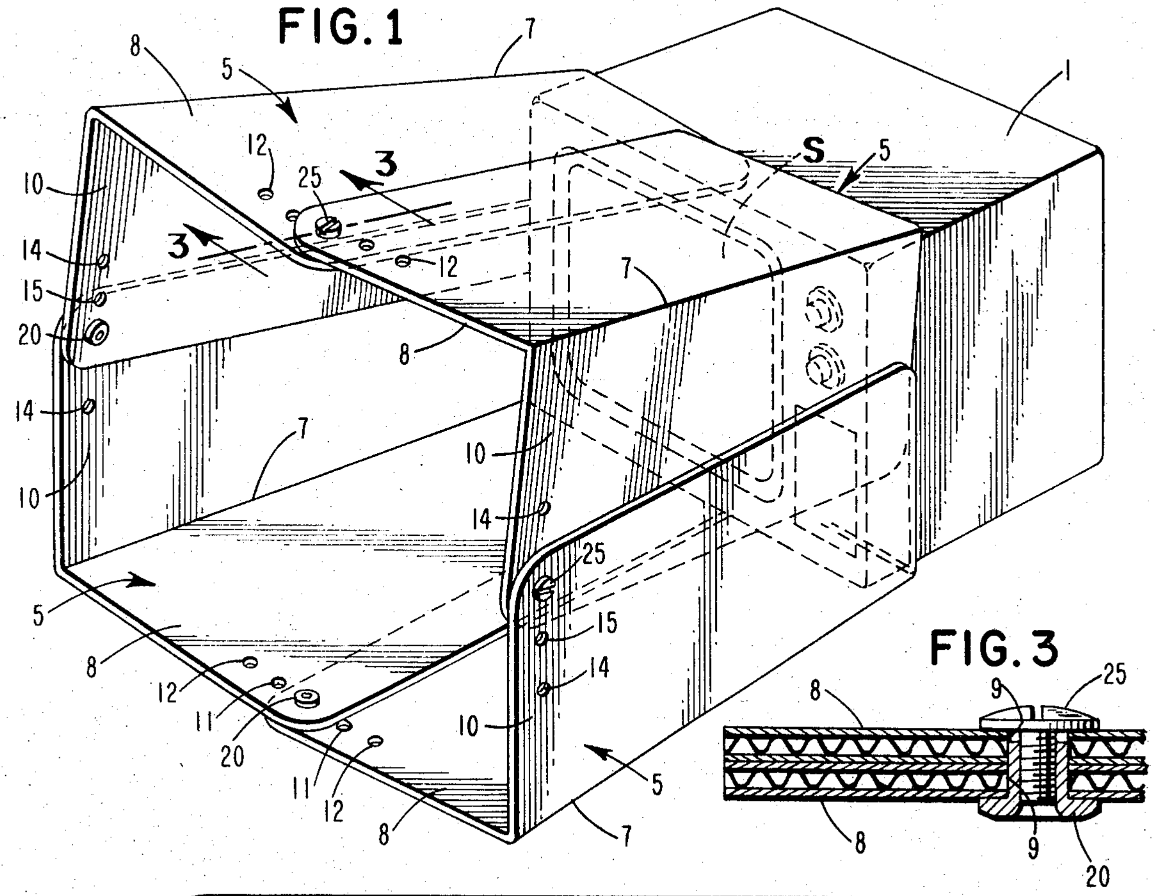
FIG. 1 is a perspective view of the invention shown in extended and adjusted position to shield the viewing screen of electronic instruments such as a television set of predetermined size. This figure illustrates the manner by which each of the initially flat sections are bent across a preformed score line to form a right-angular configuration so that when pivoted together at their forward (away from the screen) ends the resulting overlap between sections permits the opposite end of the entire assembly to completely and adequately encase the here shown screen (or apparatus) in a fashion to exclude light penetration.
FIG. 3 is an enlarged, detailed cross-sectional view, taken on the line 3—3 of FIG. 1, of one means of adjustably fastening together the overlapping L-shaped panels of adjacent sections, this means here being illustrated as a screw-type grommet which, through frictional engagement of such overlapping panels of the respective sections, permits a ready adjustment, yet maintains the respective panels in final, adjusted position.

With reference now to FIG. 1, the invention hereof is shown in assembled and fixed relationship with the screen to be used, the herein deployment or arrangement being described with regard to a television set of the portable type.

The here indicated television set 1 is of course provided with a viewing screen, here designated at S, the latter naturally facing the open end of the encircling assembly. This combination, and as stated above, represents the essence of simplicity. Each of the encompassing sides and bottom of such assembly is configured from four sections, each of which in this embodiment of the invention, is identical in shape, and each of said sections being readily formed into an L-shape for final attachment.

Figure 2:
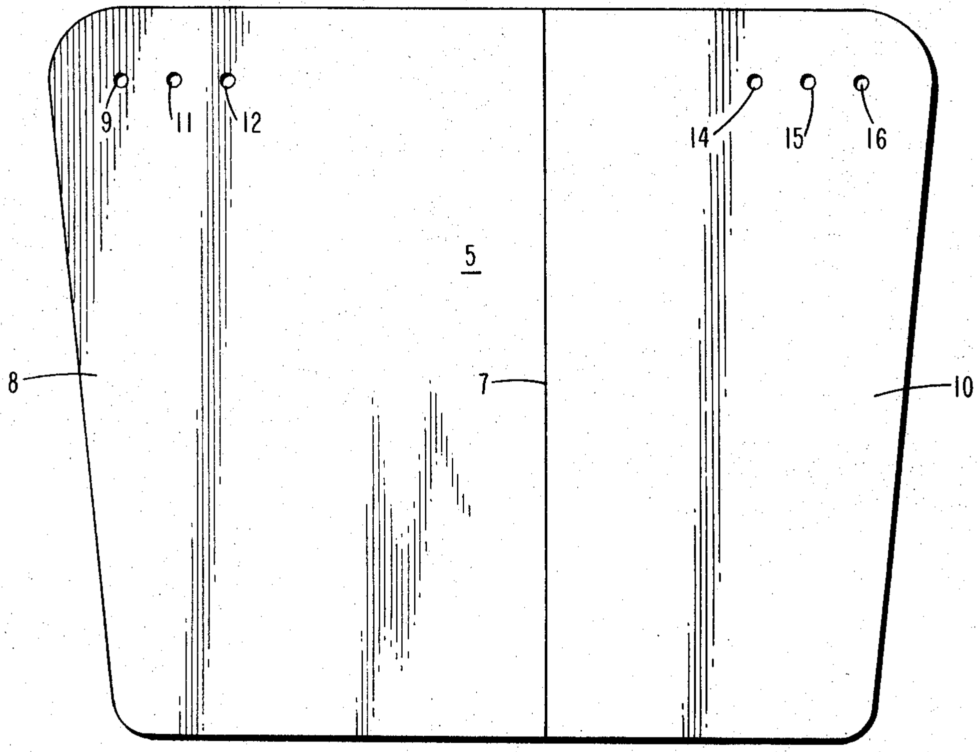
FIG. 2 is a plan view of one of the four identical sections illustrating the score line near the mid-section thereof but to one side of the center thus to form two integral panels, one of which is of greater width than the other; this plan view also illustrates a series of apertures, three in number, in each side of the section, in each "panel," and at the top portions of the latter, for purposes as will be described below.

Each one of these sections in its non-assembled state, or when laid out flat, takes that shape as shown in FIG. 2.

In order to make the final assembly assume the appearance shown in FIG. 1, this with the open end larger for viewing purposes than the end which surrounds the television set, each section, generally indicated at 5 in FIG. 2, takes a form somewhat trapezoidal in shape. Thus viewing FIG. 2, the upper end of each panel is of greater width than the lower end, and the two sides are angled somewhat with regard to the upper edge downwardly toward the lower edge of the panel. The upper and lower edges are parallel to each other.

Each section is provided with a score line 7 to thus divide each section into two panels 8 and 10, respectively, the former being larger in area than the latter. The reason for this is that the larger sections 8 are designed to accommodate the greater width of the usual type of television instrument, whereas the smaller sections 10 are adapted to fit the lesser height (height less than the width) of most television apparatus. As an alternate to this, each section can of course be scored through its vertical center line in which case the ultimate configuration would be square.

At any rate, in actual manufacture of each section the use of a score line has been found to be the most simplified method of enabling the bending of each section on said score line so that each panel with regard to the other panel, and with relationship to each other, form a right-angular configuration, and as such is shown with regard to each section in FIG. 1 of the drawings.

Each such section, and as shown in FIG. 2, is also provided with a plurality of apertures, here apertures 10, 11 and 12 in panel 8 of the section, and apertures 14, 15 and 16 in panel 10 of each of the sections. These, of course, permit variations in the amount of overlap of each panel with regard to its adjacent panel, thus permitting adaptation of the unit to various sizes of television screens or apparatus. With respect to the forward end of the assembly (the viewing end) it is thus apparent that the six apertures in each section permit nine variations in size at said forward end.

As shown in FIG. 1, each section is bent to the right-angular configuration referred to above. The apertured panel of each section, via a suitable grommet means, is pivotably attached to an adjacent panel having complementary apertures to receive the pivot means. A preferred method of attachment is illustrated in FIG. 3. Here the adjacent panels are marked 8, thus such panels being of greater size than the panels 10 (see FIG. 2). FIG. 3, being a section taken on the line 3—3 of FIG. 1, hence illustrates the interconnection between two adjacent panels 8. Here a screw-type grommet is illustrated. It consists of a female portion 20 having a lower extended flange portion as shown in FIG. 3. This female portion is internally threaded (as indicated in FIG. 3) to a predetermined depth to receive a screw element 25. The depth of the threaded portion is such that, when the screw element 25 is threaded fully into the threads of the portion 20, pressure is applied to the adjacent panels via the screw 25 and its counterpart on the opposite side--the flange portion of the female part of the grommet, and as also indicated in FIG. 3.

The same type of fixture is employed with regard to adjacent panels 8 which form the bottom portion of the shield, and the same means as illustrated with respect to the adjacent side panels 10 which form the side portion of the screen. As indicated, with this type of grommet, sufficient friction exists between each of the so attached sections to retain the assembly in adjusted position; however, on the other hand, the sections can be easily hand manipulated to accommodate any variation in size of the television unit, and this simply by varying the amount of overlap existent between each of the side, top or bottom panels.

The score line 5 which is here illustrated as permitting ready bending of the flat section to a right-angular configuration may, of course, be supplied by other media, as for example, fabric hinges may be used. However, in actual practice the score line has been found completely adequate for assembly and disassembly of the entire unit.

It, of course, makes no difference in positioning of the unit to its operative position as shown in FIG. 1 whether the top and bottom or the sides are adjusted first. Common sense dictates that the simple operation of increasing the overlap between these various shielding parts will result in a closed, contacting fit with the top, sides and bottom of the TV receiver, and irrespective of the particular size of the latter.

For collapse of the unit, reverse steps are used: The amount of overlap with respect to each side is decreased so that the portion of the end section which engage the exterior of the television set are spaced from the latter, permitting easy withdrawal of the entire assembly. With removal of the grommets 25, the four sections become separated and when flattened to original position, reassume the shape shown in FIG. 2. All four sections when superimposed one upon the other and in this flat condition can readily be stored or packed for shipment.

It is of course apparent that the particular type of grommet means to hold the overlapping panels here illustrated can take other forms. For example, a pressure-type grommet can be utilized; however, this would not permit of such ease of disassembly as that here particularly illustrated.

Although we do not intend the scope of our invention to be limited as to size, and this regarding the various elements of the assembly, an example of suitable and practical dimension of each of the sections 5 is as follows: Referring to FIG. 2, the section is approximately 2 feet across its top portion and approximately 21 inches across the bottom. As shown in this figure, the height of the section is approximately 20 inches.

Since the panel 8 is larger than the panel 10 and for the purposes above mentioned, a practical width of the panel 8 at the center line thereof is about 13 inches with the width of the panel 10 along the same line being approximately 10 inches. These dimensions will enable assembly of the unit in the aforementioned fashion to fit most, if not all, television sets of popular commercial size.

By way of summary, the advantages of our invention are many. The unit is light and durable and requires no skill whatsoever for placement and adjustment for use, and return from that position to the flat storage position. Its low cost in construction permits of a low retail price, thus being more appealable and saleable to the consumer. Most importantly, it eliminates the need for any more than a single one of these units to fit many variations in sizes of television receivers. This fundamental departure from the prior art, as we have above noted, results in eliminating any fixed attachment of predetermined sizes of pieces to fit a particular size of television, or other type of receiver for a screen upon which an image is projected.

We claim as our invention:

1. An adjustable shield for a screen of an apparatus enabling imposition of images thereon comprising four foldable and interconnecting sections, each of said sections being of approximately the same size in overall length and width, each of said sections being adapted to be folded by folding means intermediate the width thereof thereby to be positioned in right angular configuration, each of said sections at one end thereof having an aperture on each side thereof, each of said sections when in said configuration overlapping an adjacent section that sufficient amount to place the side apertures of one section in alignment with the side apertures of the adjacent section, and pivot pin means in each of said aligned apertures, whereby said sections at the opposite ends thereof form a rectangular opening of adjustable size to fit different sizes of said apparatus and screen.

2. The invention as defined in claim 1 wherein said pivot pin means comprises a pressure applied grommet.

3. The invention as defined in claim 1 wherein said pivot pin means comprises a screw threaded type grommet.

4. The invention as defined in claim 1 wherein said folding means comprises a score line across each of said sections to permit positioning of one half of one side of each section at an approximate right angle to the other half of the other side of each section, whereby when said halves are so positioned each section when overlapped with an adjacent section will form an approximate rectangle in cross-sectional configuration.

5. The invention as defined in claim 1 wherein there are a plurality of said apertures on each side of each of said sections at said one end thereof, thereby to permit greater adjustment of size of said shield via adjustment of the positioning of the amount of overlap of adjacent of said sections.

6. The invention as defined in claim 5 wherein at least three apertures are provided on each side of each of said sections.

* * * * *